(12) United States Patent
Nakatani et al.

(10) Patent No.: US 11,885,680 B2
(45) Date of Patent: Jan. 30, 2024

(54) SPECTRAL DEVICE

(71) Applicant: Konica Minolta, Inc., Tokyo (JP)

(72) Inventors: Toru Nakatani, Tokyo (JP); Toshio Kawano, Tokyo (JP); Hitoshi Nagasawa, Tokyo (JP); Koji Nagai, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 32 days.

(21) Appl. No.: 17/435,945

(22) PCT Filed: Feb. 27, 2020

(86) PCT No.: PCT/JP2020/008078
§ 371 (c)(1),
(2) Date: Sep. 2, 2021

(87) PCT Pub. No.: WO2020/179628
PCT Pub. Date: Sep. 10, 2020

(65) Prior Publication Data
US 2022/0146309 A1  May 12, 2022

(30) Foreign Application Priority Data

Mar. 4, 2019  (JP) ................................. 2019-038587

(51) Int. Cl.
*G01J 3/02* (2006.01)
*G01J 3/26* (2006.01)

(52) U.S. Cl.
CPC ........... *G01J 3/0275* (2013.01); *G01J 3/0229* (2013.01); *G01J 3/26* (2013.01)

(58) Field of Classification Search
CPC .......... G01J 3/06; G01J 3/0275; G01J 3/0229; G01J 3/26; G01J 3/2846; G01J 2003/1226; G01J 2003/285
See application file for complete search history.

(56) References Cited

U.S. PATENT DOCUMENTS

| 4,856,897 A | * | 8/1989 | Fateley | ..................... | G01J 3/44 |
|---|---|---|---|---|---|
| | | | | | 356/333 |
| 7,365,850 B2 | * | 4/2008 | Imura | ....................... | G01J 3/02 |
| | | | | | 356/326 |

(Continued)

FOREIGN PATENT DOCUMENTS

| JP | H08-128899 A | 5/1996 |
|---|---|---|
| JP | 2006177812 A | 7/2006 |
| JP | 2017207406 A | 11/2017 |

OTHER PUBLICATIONS

Linear variable filter [online], Delta Optical Thin Film Catalog, KLV Co., Ltd., Apr. 23, 2016; 2 pages; https://go.klv.co.jp/rs/467-JAD-820/images/KLV_630_Delta_filter_LVF.pdf; Concise explanation of relevance.

(Continued)

*Primary Examiner* — Michael A Lyons
(74) *Attorney, Agent, or Firm* — LUCAS & MERCANTI, LLP

(57) ABSTRACT

A spectral device is provided with: a filter having a property of transmitting light of multiple wavelength ranges from a measurement object; a driving means to slide the filter; and a detector to detect an intensity of the light from the measurement object, the light having passed through the filter, the detector to further measure the intensity of the light multiple times sequentially while the driving means slides the filter and thereby obtain multiple pieces of measured data to be used for a calculation of spectral information.

8 Claims, 8 Drawing Sheets

(56) References Cited

U.S. PATENT DOCUMENTS

| | | | | |
|---|---|---|---|---|
| 7,636,158 B1* | 12/2009 | Pawluczyk | ........... | G01J 3/0208 |
| | | | | 356/326 |
| 9,488,827 B2* | 11/2016 | Fukuyo | ..................... | G01J 3/32 |
| 10,564,334 B2* | 2/2020 | Jidai | ......................... | G01J 3/26 |
| 10,943,959 B1* | 3/2021 | Holsteen | ........... | G02F 1/133528 |
| 2018/0095207 A1* | 4/2018 | Jidai | ......................... | G01J 3/36 |
| 2018/0304574 A1* | 10/2018 | Kozar | .................... | B32B 5/142 |

OTHER PUBLICATIONS

International Search Report for the corresponding application No. PCT/JP2020/008078 dated Apr. 7, 2020, with English translation.

* cited by examiner

Spectral Transmittance of SLVF in Embodiement 1 at Point A

Spectral Transmittance of SLVF in Embodiement 1 at Point A

Spectral Transmittance of SLVF in Embodiment 1 at Points A and B

Relation between Wavelength $\lambda$ and Pseudo Wavelength p  P=log($\lambda$)

SPECTRAL DEVICE

CROSS REFERENCE TO RELATED APPLICATION

This Application is a 371 of PCT/JP2020/008078 filed on Feb. 27, 2020, which claims priority of Japanese patent application no. 2019-038587 filed Mar. 4, 2019, the above applications are incorporated herein by reference.

BACKGROUND

Technological Field

The present invention relates to: a spectral device that serves to calculate spectral information of measurement target light; and a spectral measurement data obtaining method therefor.

Description of the Related Art

Conventional spectral devices are known for obtaining spectral information by sliding a linear variable bandpass filter (LVBPF) that transmits different wavelengths depending on a part through which light passes (for example, Patent Literatures 1 and 2).

[Patent Literature 1] Japanese Unexamined Patent Application Publication No. 2006-177812
[Patent Literature 2] Japanese Unexamined Patent Application Publication No. 2017-207406

However, spectral devices that slide an LVBPF have been a problem: they perform measurement with a low efficiency of light usage and with a low signal-to-noise ratio because they do not use light of wavelengths that do not fall within a transmittable wavelength region of the LVBPF.

In particular, when they are two-dimensional spectral devices, they split a measurement target zone into many small areas, measure a small amount of light from each small area, and calculate spectral information. In addition, they use light of limited wavelengths because of their LVBPF. So, they perform measurement with a still lower efficiency of light usage and with a still lower signal-to-noise ratio.

The present invention, which has been made in consideration of such a technical background as described above, provides a spectral device that is capable of performing measurement with a high efficiency of light usage and with a high signal-to-noise ratio and a spectral measurement data obtaining method therefor.

SUMMARY

The above-described problem can be solved by the following means.

[1] A spectral device comprising:
  a filter having a property of changing a spectral transmittance depending on a position and transmitting light of multiple wavelength ranges from a measurement object;
  a driving means that slides the filter; and
  a detector to detect an intensity of the light from the measurement object, the light having passed through the filter, the detector to further measure the intensity of the light multiple times sequentially while the driving means slides the filter and thereby obtain multiple pieces of measured data to be used for a calculation of spectral information.

[2] The spectral device according to the foregoing item [1], wherein the filter has, within a measurement target wavelength region, two or more wavelength ranges with an 80-percent or more transmittance and three or more wavelength ranges with a 20-percent or less transmittance.

[3] The spectral device according to the foregoing item [1] or [2], wherein the detector is a two-dimensional sensor, the spectral device further comprising:
  an objective optical system to form a first image of a measurement target surface on the filter; and
  a relay optical system to form a second image on the two-dimensional sensor with the light having passed through the filter.

[4] A spectral measurement data obtaining method using a filter having a property of changing a spectral transmittance depending on a position and transmitting light of multiple wavelength ranges from a measurement object, wherein a detector measures an intensity of light from a measurement object multiple times sequentially while the filter is slid, the light having passed through the filter, and thereby obtains multiple pieces of measured data to be used for a calculation of spectral information.

[5] The spectral measurement data obtaining method according to the foregoing item [4], wherein the filter has, within a measurement target wavelength region, two or more wavelength ranges with an 80-percent or more transmittance and three or more wavelength ranges with a 20-percent or less transmittance.

[6] The spectral measurement data obtaining method according to the foregoing item [4] or [5],
  wherein the detector is a two-dimensional sensor,
  wherein an objective optical system forms a first image of a measurement target surface on the filter; and
  wherein a relay optical system forms a second image on the two-dimensional sensor with the light having passed through the filter.

According to the invention recited in the foregoing item [1], the filter has a spectral transmittance that changes depending on a position and a property of transmitting light of multiple wavelength ranges. A spectral device is allowed to, by sliding this filter, perform measurement with a higher efficiency of light usage and with a higher signal-to-noise ratio than in a case in which a linear variable bandpass filter (LVBPF) that transmits light of one single wavelength range is used.

According to the invention recited in the foregoing item [2], the filter has, within a measurement target wavelength region, two or more wavelength ranges with an 80-percent or more transmittance and three or more wavelength ranges with a 20-percent or less transmittance. So, measurement is performed with a high efficiency of light usage and with a high signal-to-noise ratio.

According to the invention recited in the foregoing item [3], the spectral device is allowed to calculate two-dimensional spectral information with a high signal-to-noise ratio.

According to the invention recited in the foregoing item [4], measurement data can be obtained with a high efficiency of light usage and with a high signal-to-noise ratio.

According to the invention recited in the foregoing item [5], measurement data can be obtained constantly with a high efficiency of light usage and with a high signal-to-noise ratio.

According to the invention recited in the foregoing item [6], measurement data to be used for a calculation of two-dimensional spectral information can be obtained with a high signal-to-noise ratio.

DETAILED DESCRIPTION OF EMBODIMENTS

Hereinafter, one or more embodiments of the present invention will be described with reference to the drawings.

Figure 1:
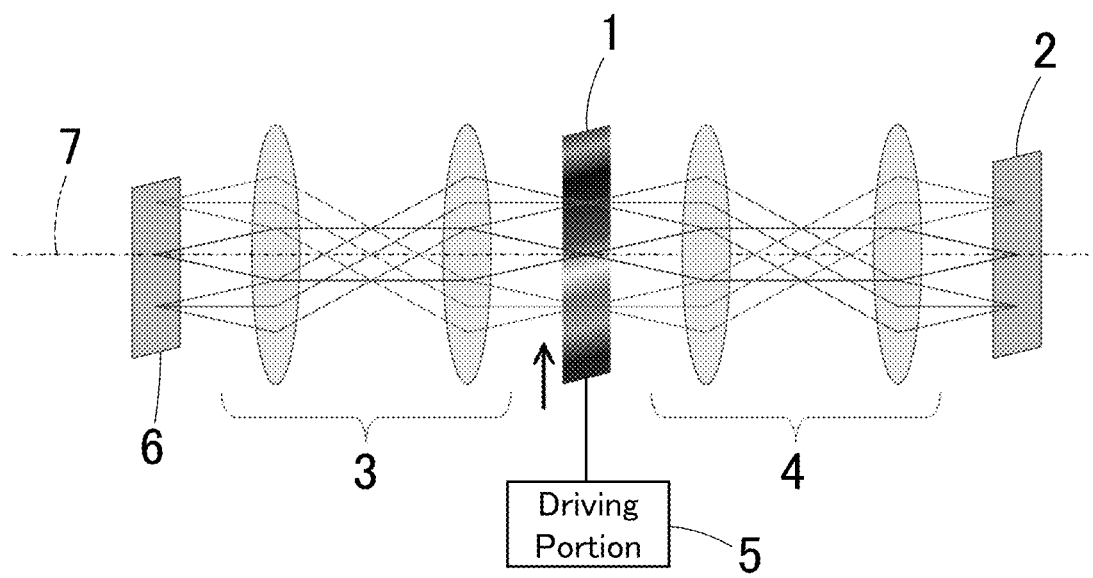
FIG. 1 illustrates a configuration of a spectral device according to one embodiment of the present invention.

FIG. 1 illustrates a configuration of a spectral device according to one embodiment of the present invention. As illustrated in FIG. 1, the spectral device is provided with: a filter 1; a two-dimensional sensor 2; an objective optical system 3 that forms an image of a measurement target surface of a measurement object 6 on the filter 1; a relay optical system 4 that forms an image on the two-dimensional sensor with light having passed through the filter; and a driving portion 5. The spectral device is thus configured to form an image of the measurement target surface on a surface of the filter 1 by the objective optical system 3 and forms an image on the two-dimensional sensor 2 with light having passed through the filter 1 by the relay optical system 4. The objective optical system 3 and the relay optical system 4 each have a publicly-known configuration including a plurality of lenses.

The driving portion 5 drives and slides the filter 1 in a direction perpendicular to an optical axis 7 (in a direction indicated by an upward pointing arrow in FIG. 1); the two-dimensional sensor 2 is a detector that detects the intensity of light from the measurement object, being constituted by an image pickup element.

The filter 1 is a filter having a property of changing a spectral transmittance depending on a position in the direction perpendicular to the optical axis 7 and transmitting light of multiple wavelength ranges (SLVF). In the following description, the filter will also be referred to as SLVF. A spectral transmittance is a percentage of incident light transmitted, by wavelength. A measurement target wavelength region preferably shows a property of having two or more wavelength ranges with an 80-percent or more transmittance and three or more wavelength ranges with a 20-percent or less transmittance. The filter 1, whose configuration is described above, allows performing measurement constantly with a high efficiency of light usage and with a high signal-to-noise ratio.

The two-dimensional sensor 2 picks up images sequentially while the driving portion 5 drives and slides the filter 1, whose property is described above, in a direction perpendicular to the optical axis 7. The images (two-dimensional information) are obtained using light of different wavelength regions. By computing with the data, spectral information is calculated about each point. Details of the mechanism of driving the filter 1 by the driving portion 5 are known to the public; any of the driving mechanisms described in Patent Literatures 1 and 2 or another common driving method may be used.

The spectral device may calculate the spectral information with the data obtained by the two-dimensional sensor 2.

Alternatively, the spectral device may transfer the data obtained by the two-dimensional sensor 2 to an external computing device such as a personal computer so that the external computing device will calculate the spectral information with the data.

The following discussion relates to data measured at a certain pixel of the two-dimensional sensor 2. Light from its corresponding area of a measurement target surface is concentrated to the pixel and measured. Here, a spectral radiance V of the measurement object can be represented by Expression 1.

$$V = \begin{pmatrix} v_1 \\ v_2 \\ \vdots \\ v_n \end{pmatrix}$$ [Expression 1]

As discussed later, each entry is a pseudo wavelength that is a logarithmically transformed wavelength; these entries are sampled at even intervals.

A diagonal matrix having a spectral sensitivity of the measuring system excluding the filter 1, as a diagonal component, can be represented by Expression 2.

$$Q = \begin{pmatrix} q_1 & & 0 \\ & q_2 & \\ & & \ddots \\ 0 & & q_n \end{pmatrix}$$ [Expression 2]

The diagonal matrix includes an efficiency and transmittance of the optical system excluding the filter 1 and a spectral sensitivity of the two-dimensional sensor 2. The optical measuring system has no sensitivity with wavelengths that do not fall within the measurement target wavelength region.

Pieces of measured data sequentially obtained while the filter 1 is slid (moved) can be represented by a measured values vector M.

$$M = \begin{pmatrix} m_1 \\ m_2 \\ \vdots \\ m_n \end{pmatrix}$$ [Expression 3]

A spectral transmittance of the filter 1 that is obtained in each measurement can be represented by a row vector, and all spectral transmittances can be represented by Expression 4.

$$S = \begin{pmatrix} s_{11} & \cdots & s_{1n} \\ \vdots & \ddots & \vdots \\ s_{n1} & \cdots & s_{nn} \end{pmatrix}$$ [Expression 4]

In the above-introduced matrix S, the j-th row shows a spectral transmittance of the filter 1 that is obtained in the j-th measurement.

The relationship between V, Q, M, and S can be represented by $M = S \times Q \times V$. Measurement is performed n times while the driving portion 5 moves the filter 1 by a predetermined amount every time, and thus the measured values column vector M is obtained.

A spectral radiance V is obtained by computing with $V = Q^{-1} \times S^{-1} \times M$. The data S and Q can be obtained in advance by measurement; and inverse matrices of them, $S^{-1}$ and $Q^{-1}$ can be calculated in advance as well.

Embodiment 1

Figures 2A, 2B:
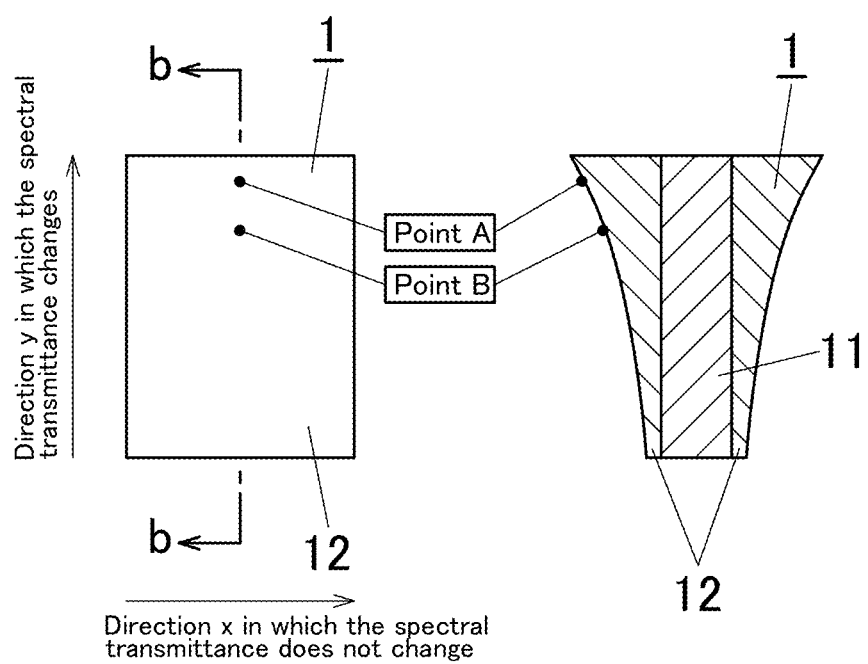
FIG. 2A is a front view of a filter when viewed in a direction in which light is emitted.
FIG. 2B is a cross-sectional view of the filter when cut along a line b-b of FIG. 2A.

FIG. 2 is a schematic drawing of one example of the filter 1. FIG. 2A is a front view when viewed in a direction in which light is emitted; FIG. 2B is a cross-sectional view when cut along a line b-b of FIG. 2A.

A spectral transmittance of the filter 1 illustrated in FIG. 2 will be described. In the front view of FIG. 2A, a direction y is a direction parallel with the direction in which the filter 1 is slid (an up-down direction of FIG. 2A, and a direction x is a direction perpendicular to the direction in which the filter 1 is slid. The filter 1 of FIG. 2 changes a spectral transmittance depending on a position in the direction y but does not change the same depending on the position in the direction x.

Figure 3:
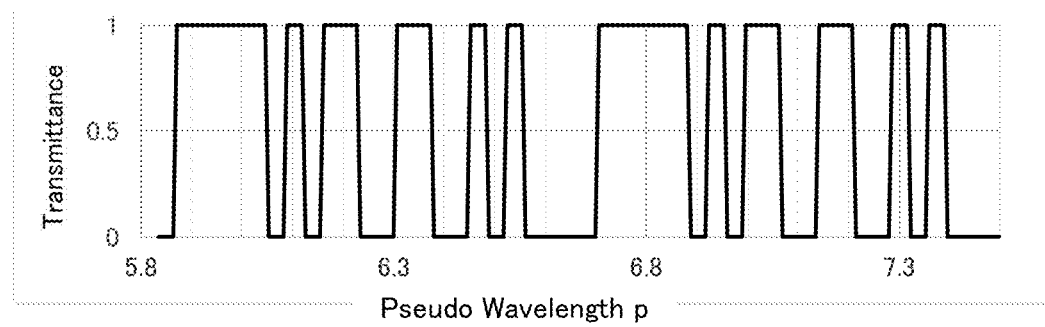
FIG. 3 is a graph showing a spectral transmittance of the filter of FIG. 2 with a horizontal axis representing a pseudo wavelength p and a vertical axis representing a transmittance.
Figure 4:
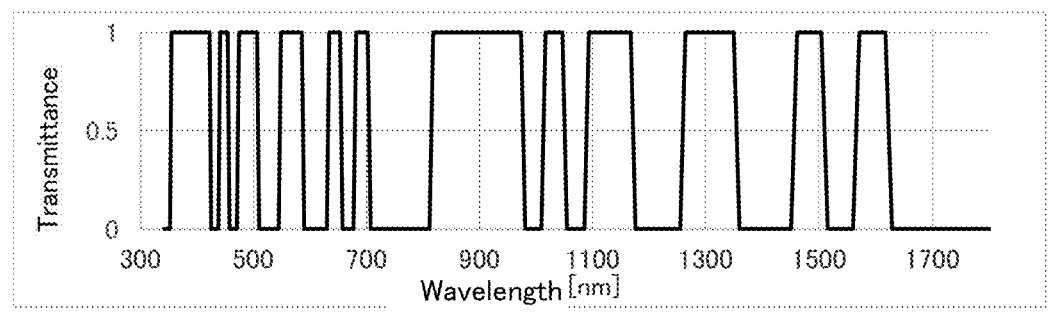
FIG. 4 is a graph showing a spectral transmittance of the filter of FIG. 2 with a horizontal axis representing a wavelength p and a vertical axis representing the transmittance.

The filter of FIG. 2 is configured to have a spectral transmittance as shown in FIGS. 3 and 4 at a point A. FIG. 3 is a graph with a horizontal axis representing a pseudo wavelength p and a vertical axis representing a transmittance; FIG. 4 is a graph with a horizontal axis representing a wavelength p and a vertical axis representing the transmittance. The measurement target wavelength region has two or more wavelength ranges with an 80-percent or more transmittance and three or more wavelength ranges with a 20-percent or less transmittance. The pseudo wavelength p will be described later.

Figure 5:
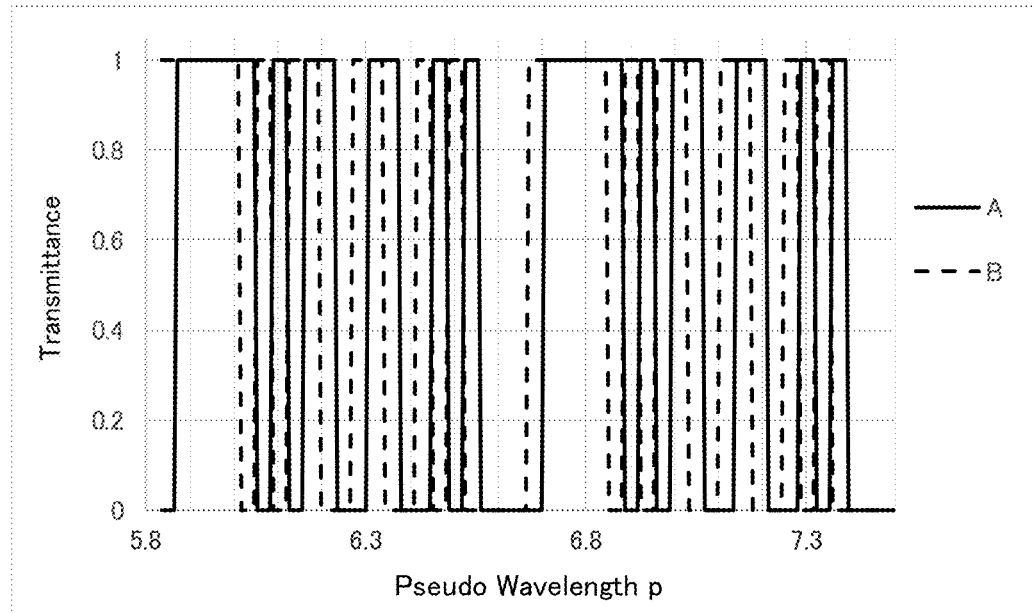
FIG. 5 is a graph showing a spectral transmittance of the filter of FIG. 2 at a point A and a point B that is separated from the point A by a distance Δy in a direction y.

As illustrated in FIG. 2, the filter 1 has a point B that is separated from the point A by a direction Δy in the direction y. FIG. 5 is a graph showing a spectral transmittance with a horizontal axis representing a pseudo wavelength p. In the graph, a spectral transmittance at the point B is what a spectral transmittance at the point A is like when it shifts to the side of shorter wavelengths by a predetermined amount. The filter 1, whose property is described above, can be constituted by an interference filter-mounted filter that is a glass substrate 11 having a multi-layer dielectric filter (to be also referred to as interference filter) 12 on each surface facing in a direction along the optical axis. As indicated in the schematic drawing, each multi-layer filter 12 gradually changes a thickness depending on the position, so the transmittance spectrum shows a property of shifting.

Measurement is performed 23 times while the driving portion 5 slides the filter 1 by the distance Δy, every time, in the direction y in which the filter 1 changes the spectral transmittance, and thus the transmittance of the filter 1 can be represented by the matrix S.

$$S = \begin{pmatrix}
1 & 1 & 1 & 1 & 0 & 1 & 0 & 1 & 1 & 0 & 0 & 1 & 1 & 0 & 0 & 1 & 0 & 1 & 0 & 0 & 0 & 0 & 0 \\
0 & 1 & 1 & 1 & 1 & 0 & 1 & 0 & 1 & 1 & 0 & 0 & 1 & 1 & 0 & 0 & 1 & 0 & 1 & 0 & 0 & 0 & 0 \\
0 & 0 & 1 & 1 & 1 & 1 & 0 & 1 & 0 & 1 & 1 & 0 & 0 & 1 & 1 & 0 & 0 & 1 & 0 & 1 & 0 & 0 & 0 \\
0 & 0 & 0 & 1 & 1 & 1 & 1 & 0 & 1 & 0 & 1 & 1 & 0 & 0 & 1 & 1 & 0 & 0 & 1 & 0 & 1 & 0 & 0 \\
0 & 0 & 0 & 0 & 1 & 1 & 1 & 1 & 0 & 1 & 0 & 1 & 1 & 0 & 0 & 1 & 1 & 0 & 0 & 1 & 0 & 1 & 0 \\
0 & 0 & 0 & 0 & 0 & 1 & 1 & 1 & 1 & 0 & 1 & 0 & 1 & 1 & 0 & 0 & 1 & 1 & 0 & 0 & 1 & 0 & 1 \\
1 & 0 & 0 & 0 & 0 & 0 & 1 & 1 & 1 & 1 & 0 & 1 & 0 & 1 & 1 & 0 & 0 & 1 & 1 & 0 & 0 & 1 & 0 \\
0 & 1 & 0 & 0 & 0 & 0 & 0 & 1 & 1 & 1 & 1 & 0 & 1 & 0 & 1 & 1 & 0 & 0 & 1 & 1 & 0 & 0 & 1 \\
1 & 0 & 1 & 0 & 0 & 0 & 0 & 0 & 1 & 1 & 1 & 1 & 0 & 1 & 0 & 1 & 1 & 0 & 0 & 1 & 1 & 0 & 0 \\
0 & 1 & 0 & 1 & 0 & 0 & 0 & 0 & 0 & 1 & 1 & 1 & 1 & 0 & 1 & 0 & 1 & 1 & 0 & 0 & 1 & 1 & 0 \\
0 & 0 & 1 & 0 & 1 & 0 & 0 & 0 & 0 & 0 & 1 & 1 & 1 & 1 & 0 & 1 & 0 & 1 & 1 & 0 & 0 & 1 & 1 \\
1 & 0 & 0 & 1 & 0 & 1 & 0 & 0 & 0 & 0 & 0 & 1 & 1 & 1 & 1 & 0 & 1 & 0 & 1 & 1 & 0 & 0 & 1 \\
1 & 1 & 0 & 0 & 1 & 0 & 1 & 0 & 0 & 0 & 0 & 0 & 1 & 1 & 1 & 1 & 0 & 1 & 0 & 1 & 1 & 0 & 0 \\
0 & 1 & 1 & 0 & 0 & 1 & 0 & 1 & 0 & 0 & 0 & 0 & 0 & 1 & 1 & 1 & 1 & 0 & 1 & 0 & 1 & 1 & 0 \\
0 & 0 & 1 & 1 & 0 & 0 & 1 & 0 & 1 & 0 & 0 & 0 & 0 & 0 & 1 & 1 & 1 & 1 & 0 & 1 & 0 & 1 & 1 \\
1 & 0 & 0 & 1 & 1 & 0 & 0 & 1 & 0 & 1 & 0 & 0 & 0 & 0 & 0 & 1 & 1 & 1 & 1 & 0 & 1 & 0 & 1 \\
1 & 1 & 0 & 0 & 1 & 1 & 0 & 0 & 1 & 0 & 1 & 0 & 0 & 0 & 0 & 0 & 1 & 1 & 1 & 1 & 0 & 1 & 0 \\
0 & 1 & 1 & 0 & 0 & 1 & 1 & 0 & 0 & 1 & 0 & 1 & 0 & 0 & 0 & 0 & 0 & 1 & 1 & 1 & 1 & 0 & 1 \\
1 & 0 & 1 & 1 & 0 & 0 & 1 & 1 & 0 & 0 & 1 & 0 & 1 & 0 & 0 & 0 & 0 & 0 & 1 & 1 & 1 & 1 & 0 \\
0 & 1 & 0 & 1 & 1 & 0 & 0 & 1 & 1 & 0 & 0 & 1 & 0 & 1 & 0 & 0 & 0 & 0 & 0 & 1 & 1 & 1 & 1 \\
1 & 0 & 1 & 0 & 1 & 1 & 0 & 0 & 1 & 1 & 0 & 0 & 1 & 0 & 1 & 0 & 0 & 0 & 0 & 0 & 1 & 1 & 1 \\
1 & 1 & 0 & 1 & 0 & 1 & 1 & 0 & 0 & 1 & 1 & 0 & 0 & 1 & 0 & 1 & 0 & 0 & 0 & 0 & 0 & 1 & 1 \\
1 & 1 & 1 & 0 & 1 & 0 & 1 & 1 & 0 & 0 & 1 & 1 & 0 & 0 & 1 & 0 & 1 & 0 & 0 & 0 & 0 & 0 & 1
\end{pmatrix}$$

[Expression 5]

In the above-introduced matrix S, the j-th row indicates a spectral transmittance of the filter 1 that is obtained in the j-th measurement, and the k-th column indicates a spectral transmittance with the pseudo wavelength $p_k$.

$$p_k = p_1 + (k-1)\Delta p, \text{ where } k=1,2,3,\ldots,n$$

They are at even intervals along the pseudo wavelength p. In this embodiment, this means:

$p_1$=5.886, the corresponding wavelength is 360.0 nm;
$p_2$=5.922, the corresponding wavelength is 373.3 nm;
$p_3$=5.959, the corresponding wavelength is 387.1 nm; and
. . .
$p_{23}$=6.685, the corresponding wavelength is 800.0 nm.

This matrix S matches a spectrum calculated by Hadamard transform. The signal-to-noise ratio, which is computed by inverting a matrix of measured spectral values, is the following number times higher than in a case in which a linear variable bandpass filter (LVBPF) that transmits only one single wavelength region is used (the transmittance matrix S is a diagonal matrix).

$$\sqrt{\frac{(n+1)^2}{4n}}$$

[Expression 6]

In the above-introduced expression, n is the ordinal number of both row and column of the matrix; n is equal to 23 in Embodiment 1. For further information, please consult the journal article (Arikawa, Tatsuo; Spectral Analysis by Hadamard Transform. *The Journal of the Physical Society of Japan* 1984, Vol. 39, No. 1, 835).

Hereinafter, the pseudo wavelength p will be described.

The filter 1 is an interference filter-mounted filter that is the glass substrate 11 having the multi-layer dielectric filter 12 on each surface thereof, as illustrated in FIG. 2. In this case, even if each of the multi-layer filters 12 were k times thicker than the original one, the transmittance spectrum would not be subjected to a simple wavelength shift. Here, dispersion due to the refractive index of the multi-layer dielectric filter 12 is ignored for simplicity. The transmittance of the interference filter 12 with a wavelength 7 is represented by $T_1(\lambda)$. When each layer of the interference filters 12 is k times thicker, the transmittance of the interference filter 12 is represented by $T_k(\lambda)$. The relationship can be expressed by $T_1(\lambda_1)=T_k(k\lambda_1)$, which does not mean a simple wavelength shift.

The following discussion relates to transformation from the wavelength $\lambda$ to the pseudo wavelength p.

$$\lambda = \exp(p)$$

$$p = \log(\lambda)$$

The transmittance of the interference filter 12 with the pseudo wavelength p is represented by a function $U_1$.

$$T_1(\lambda_1) = U_1(p_1)$$

When each layer of the interference filter 12 is k times thicker, the transmittance of the interference filter 12 is represented by a function $U_k$.

$$T_k(\lambda_k) = U_k(p_k)$$

The relationship can be expressed by: $T_1(\lambda_1) = U_1(p_1) = T_k(\lambda_k) = U_k(p_k)$ With reference to the equation $T_1(\lambda_1)=T_k(k\lambda_1)$, the following equation holds true:

$$\lambda_k = k\lambda_1$$

Here, $\lambda_1=\exp(p_1)$ and $p_k=\log(\lambda_k)$ are provided. The relationship can be expressed by:

$$\lambda_k = k\lambda_1 = \exp(p_k) = k \times \exp(p_1) = \exp(\log(k)+p_1)$$

With reference to the equation $p_k=\log(k)+p_1$, the following equation holds true:

$$U_1(p_1) = U_k(p_k) = U_k(\log(k)+p_1)$$

This means, when each layer of the interference filter 12 is k times thicker, the transmittance will be shifted by log(k) along an axis transformed from wavelength $\lambda$ to pseudo wavelength p.

When the filter 1 whose property is described above is used, the filter 1 is moved every time such that the pseudo wavelength p changes at a constant pitch. After measurement is performed multiple times sequentially, an inverse matrix is obtained by computing. Spectral information is thus plotted at a constant pitch along an axis representing the pseudo wavelength p. By transforming it to the wavelength $\lambda$, spectral information with a horizontal axis representing the wavelength $\lambda$ can be obtained easily. It should be noted that, in that case, data will not be plotted at a constant pitch along the axis representing the wavelength $\lambda$.

$$\frac{d\lambda}{dp} = \exp(p) = \lambda \qquad \text{[Expression 7]}$$

This means, the pitch along the axis representing wavelength $\lambda$ is proportional to the wavelength $\lambda$.

Regarding the thickness of each layer of the interference filter 12, the layer number is represented by i, and the position in the direction y in which the spectral transmittance changes is represented by $y_k$.

$$y_k = y_1 + (k-1) \times \Delta y, \text{ where } k = 1,2,3, \ldots, n$$

When the thickness at the position is represented by $h_i(y_k)$, the interference filter 12 is constructed such that the following expression holds true.

$$h_i(y_k) = h_{i1} * g^{k-1} = \qquad \text{[Expression 8]}$$
$$h_{i1} * \exp\left(\frac{\log(g)}{\Delta y} * (y_k - y_1)\right) = h_{i1} * \exp(\log(g) * (k-1))$$

Each layer of the interference filter 12 that is constructed accordingly becomes g times thicker every time the position changes by $\Delta y$.

As described above, when each layer of the interference filter 12 is k times thicker, the spectral transmittance is shifted by log(k) along an axis representing the pseudo wavelength p. Starting from the position $y_1$, the amount of shift of the spectral transmittance at the position yk can be represented by $\log(k) \times (k-1)$. So, it is shifted by that amount of shift. When the pitch of the above-mentioned pseudo wavelength is represented by $\Delta p$, $\Delta p = \log(g)$ holds true, then the following equation holds true as well.

$$p_k = p_1 + (k-1) \times \log(g)$$

Figure 6:
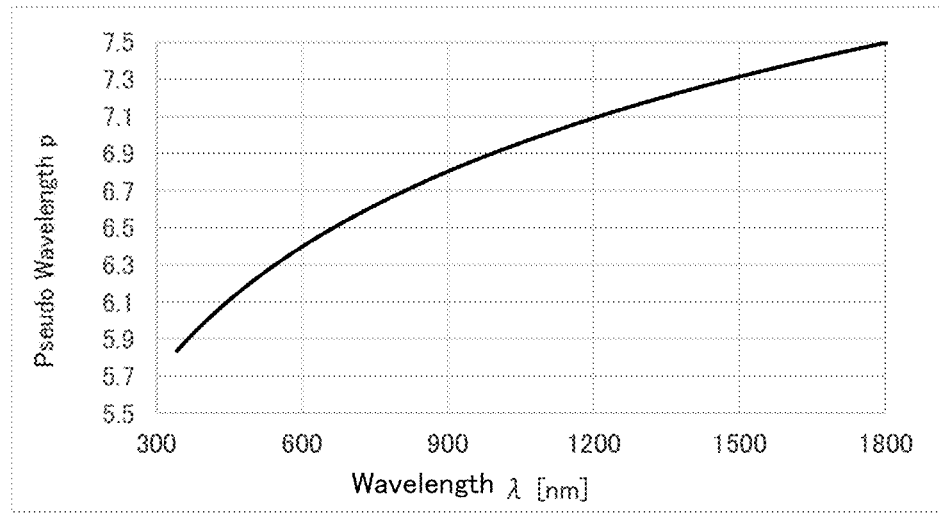
FIG. 6 is a graph showing a relationship between a wavelength λ and a pseudo wavelength p about the filter of FIG. 2.
Figure 7:
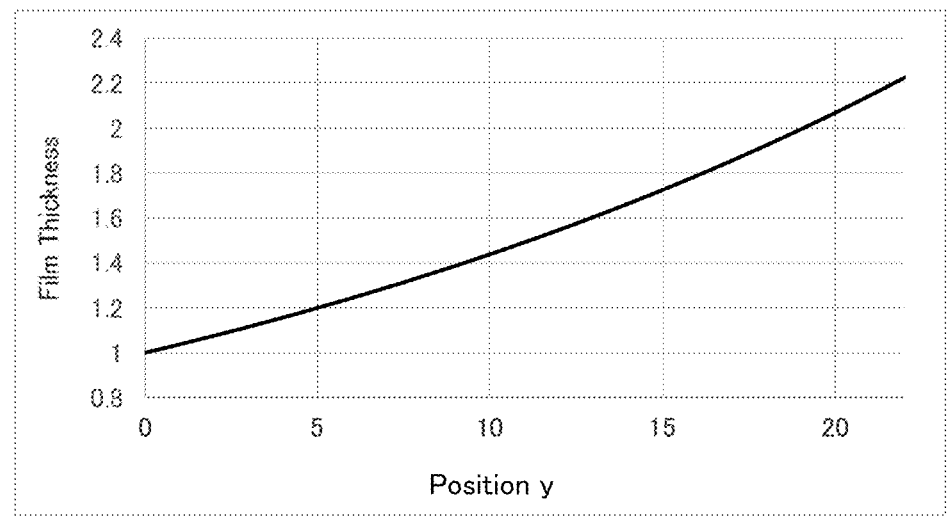
FIG. 7 is a graph showing a relationship between a position y and the thickness of an interference film about the filter of FIG. 2.

The amount of shift is linear with respect to the position y: the pseudo wavelength p is shifted by a constant pitch every time the position y changes by a constant distance. FIG. 6 illustrates a relationship between the wavelength $\lambda$ and the pseudo wavelength p in the present embodiment; FIG. 7 illustrates a relationship between the position y of the filter 1 and the thickness of the interference film. In the present embodiment, when the filter 1 is slid by 22 mm in the direction y, the interference film is 2.222 times thicker and the pseudo wavelength p is shifted by 0.7985. For example, the pseudo wavelength p is shifted from 6.6846 ($\lambda$=800 nm) to 5.8861 ($\lambda$=360 nm).

The discussion relates to a certain pixel of the two-dimensional sensor 2. Measurement is performed 23 times while the filter 1 is slid by 1 mm every time, and thus the measured values vector M is obtained. Then a spectrum is calculated by computing as described above.

Here, the magnifying power of the relay optical system 4 is −1 and the pixel pitch in the direction y of the two-dimensional sensor 2 is 0.1 mm. Measurement is performed multiple times sequentially while the filter 1 is slid by 0.1 mm, every time, in the direction y, and thus a measured values vector of all pixels can be obtained. In this case, while a first line of the two-dimensional sensor 2 performs the k-th measurement, an 11-th line of the two-dimensional sensor 2 can perform the (k−1)-th measurement simultaneously. This will bring a higher degree of efficiency in measurement.

Figure 8:
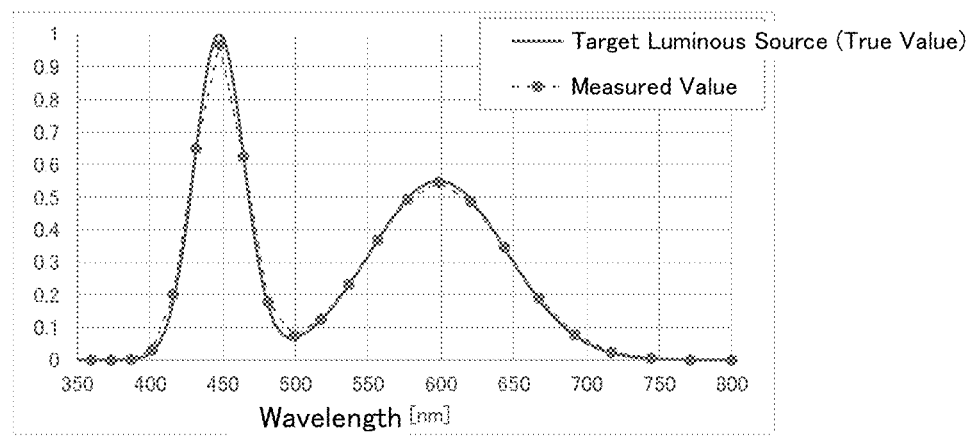
FIG. 8 is a graph showing a result of simulating a spectrum by obtaining measured data at a certain pixel of a two-dimensional sensor and computing.

FIG. 8 illustrates a result of simulating a spectrum, in the present embodiment, by obtaining measured data at a certain pixel of the two-dimensional sensor 2 and computing. In FIG. 8, the solid line indicates values practically measured with a target luminous source (true values), and the dashed line indicates computed values. As is understood from FIG. 8, the practically measured result and the computed result match very well, and it is a successful simulation.

Figure 9:
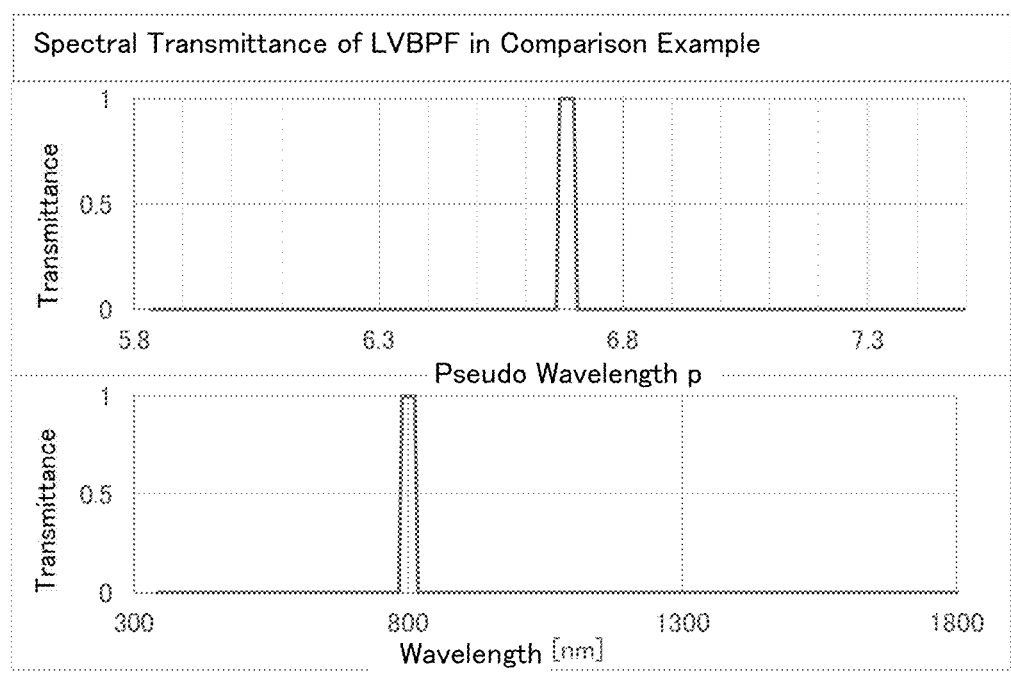
FIG. 9 illustrates spectral transmittances of a linear variable bandpass filter (LVBPF) in a comparison example; an upper graph shows a relationship between the pseudo wavelength p and the transmittance and a lower graph shows a relationship between the wavelength λ and the transmittance.

When a common linear variable bandpass filter (LVBPF) that transmits only one single wavelength region is used, on the assumption that noise can randomly occur every time measurement is performed, the signal-to-noise ratio is 2.502 times higher than in a case in which a system (comparison example) having an equivalent spectral resolution is used. This matches a result from the above-mentioned signal-to-noise ratio theoretical formula, Expression 6, when n equals 23. FIG. 9 illustrates spectral transmittance of the linear variable bandpass filter (LVBPF) in the comparison example. In this figure, an upper graph shows a relationship between the pseudo wavelength p and the transmittance, and a lower graph shows a relationship between the wavelength $\lambda$ and the transmittance. The transmittance matrix S of the filter in the comparison example is a 23×23 diagonal matrix.

Embodiment 2

Figure 10:
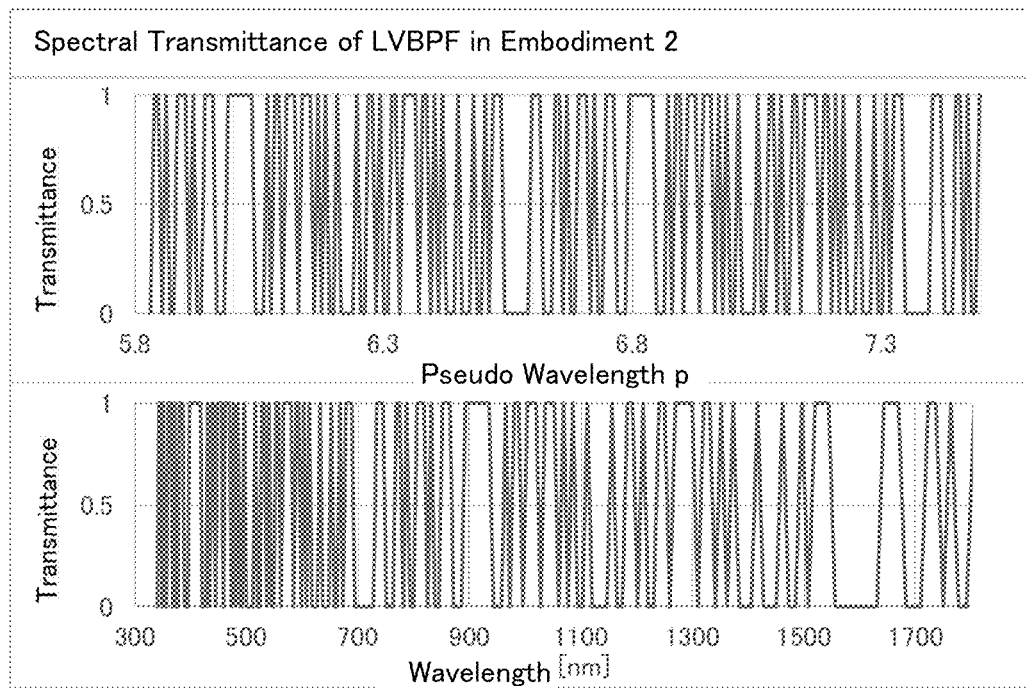
FIG. 10 illustrates spectral transmittances of a filter in the embodiment 2; an upper graph shows a relationship between the pseudo wavelength p and the transmittance and a lower graph shows a relationship between the wavelength λ and the transmittance.

The embodiment 2 has a basic configuration identical to that of the embodiment 1, except for the property of the filter 1. The transmittance matrix S of this filter 1 is a matrix with a different number of rows and columns from that in the embodiment 1. FIG. 10 illustrates a spectral transmittance of the filter 1 in the embodiment 2. An upper graph shows a relationship between the pseudo wavelength p and the transmittance, and a lower graph shows a relationship between the wavelength $\lambda$ and the transmittance.

In the embodiment 2, the transmittance matrix matches a spectrum calculated by Hadamard transform when n equals 103.

Figure 11:
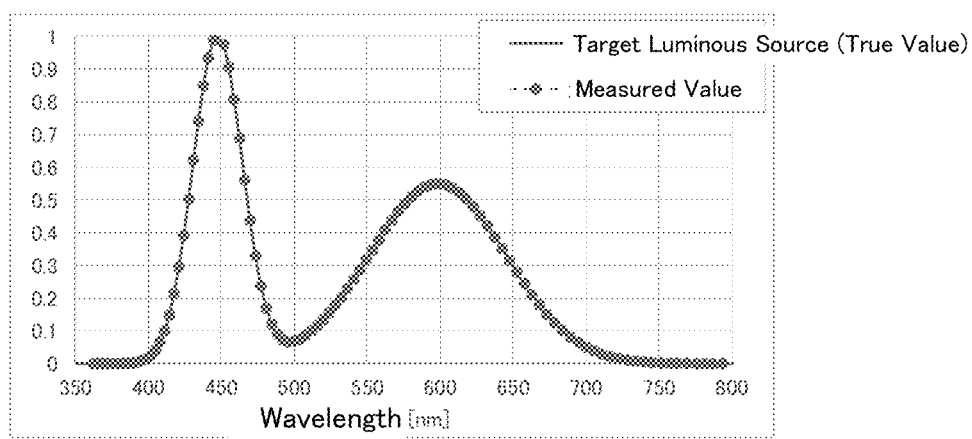
FIG. 11 is a graph showing a result of simulating a spectrum, in the embodiment 2, by obtaining measured data at a certain pixel of the two-dimensional sensor and computing.

FIG. 11 illustrates a result of simulating a spectrum, in the embodiment 2, by obtaining measured data at a certain pixel of the two-dimensional sensor 2 and computing. In FIG. 11, the solid line indicates values practically measured with a target luminous source (true values), and the dashed line indicates computed values. As is understood from this figure, the practically measured result and the computed result match very well, and it is a successful simulation.

The signal-to-noise ratio is 5.124 times higher than in a case in which a linear variable bandpass filter (LVBPF) having an equivalent spectral resolution is used. This matches a result from the above-mentioned signal-to-noise ratio theoretical formula, Expression 6, when n equals 103. The transmittance matrix S of the linear variable bandpass filter (LVBPF) according to the comparison is a 103×103 diagonal matrix.

In the embodiment 2, the spectral resolution is higher than in the embodiment 1, and the signal-to-noise ratio is higher than in the embodiment 1 as well.

Embodiment 3

Figure 12:
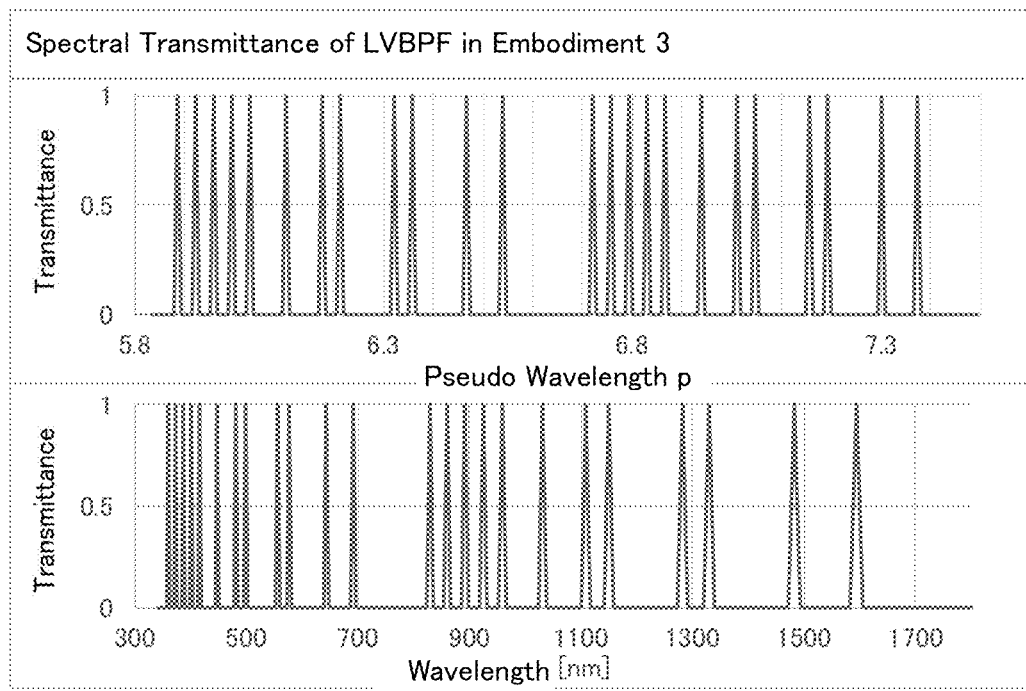
FIG. 12 illustrates spectral transmittances of the filter in the embodiment 2; an upper graph shows a relationship between the pseudo wavelength p and the transmittance and a lower graph shows a relationship between the wavelength λ and the transmittance.

The embodiment 3 has a basic configuration identical to that of the embodiment 1, except for the property of its filter 1. The transmittance matrix S of this filter 1 is a matrix with a different number of rows and columns from that in the embodiment 1. FIG. 12 illustrates spectral transmittance of the filter 1 in the embodiment 3. An upper graph shows a relationship between the pseudo wavelength p and the transmittance, and a lower graph shows a relationship between the wavelength λ and the transmittance.

The transmittance matrix S of the filter 1 in the embodiment 3 is a 111×111 matrix (111=23+22×4) with four more rows and columns than the 23×23 matrix in the embodiment 1, and the four more rows and columns contain only zeros.

Figure 13:
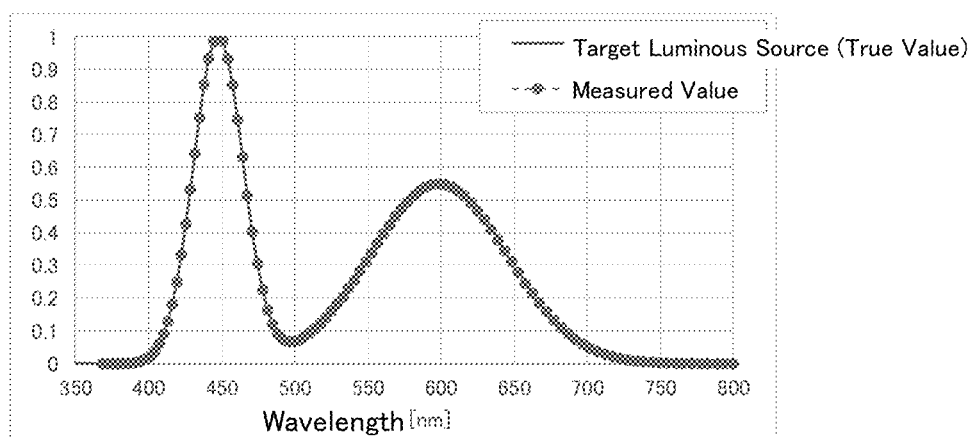
FIG. 13 is a graph showing a result of simulating a spectrum, in the embodiment 3, by obtaining measured data at a certain pixel of the two-dimensional sensor and computing.

FIG. 13 illustrates a result of simulating a spectrum, in the embodiment 3, by obtaining measured data at a certain pixel of the two-dimensional sensor 2 and computing. In FIG. 13, the solid line indicates values practically measured with a target luminous source (true values), and the dashed line indicates computed values. As is understood from this figure, the practically measured result and the computed result match very well, and it is a successful simulation.

The signal-to-noise ratio is 2.502 times higher than in a case in which a linear variable bandpass filter (LVBPF) having an equivalent spectral resolution is used. Similar to the embodiment 1, this matches a result from the above-mentioned signal-to-noise ratio theoretical formula, Expression 6, when n equals 23. The transmittance matrix S of the linear variable bandpass filter (LVBPF) according to the comparison is a 111×111 diagonal matrix.

In the embodiment 3, the spectral resolution is equal to or higher than in the embodiment 2, but the signal-to-noise ratio, in contrast, is lower than in the embodiment 2. The filter 1 in the embodiment 2 has a spectral transmittance whose waveforms are complex, showing a high degree of difficulty in production. The filter 1 in the embodiment 3 has a spectral transmittance whose waveforms are simple, showing a reasonable degree of difficulty in production; for this reason, the filter 1 in the embodiment 3 is preferred.

As described above, in this embodiment, the filter 1 has a spectral transmittance that changes depending on a position and a property of transmitting light of multiple wavelength ranges. A spectral device is allowed to, by sliding this filter 1, perform measurement with a higher efficiency of light usage and with a higher signal-to-noise ratio than in a case in which a linear variable bandpass filter (LVBPF) that transmits light of only one single wavelength range is used.

In the above-described embodiments, dispersion due to the refractive index of the multi-layer dielectric filter 12 is ignored for simplicity. In reality, dispersion due to the refractive index causes errors in the calculations given above. So, the construction and/or thickness of the filter may be adjusted to minimize the errors.

Furthermore, in the above-described embodiments, it is configured such that the transmittance waveform related to the pseudo wavelength is shifted by a fixed amount while the filter 1 is moved by a fixed amount in the direction y. The filter 1 may be moved by an unfixed amount. The transmittance waveform may be shifted by an unfixed amount and/or be deformed to some extent. In this case, spectral information is calculated but not with a high signal-to-noise ratio.

Furthermore, in the above-described embodiments, the filter 1 is the glass substrate 11 having the interference filter 12 on each surface facing in the direction along the optical axis. Alternatively, it may be the glass substrate 11 having the interference filter 12 on either of the surfaces. There may be multiple the filter 1 to reach a desired spectral transmittance.

A short wave pass cutoff filter and/or a long wave pass cutoff filter that blocks light of wavelengths not falling within a target wavelength region may be provided in the optical system.

INDUSTRIAL APPLICABILITY

The present embodiment can be applied to calculate spectral information of measurement target light.

What is claimed is:

1. A spectral device comprising:
   a filter that changes a spectral transmittance depending on a position, the filter transmitting light of multiple wavelength ranges from a measurement object at any position to make the spectral transmittance allow Hadamard transform spectrometry;
   a driver means that slides the filter; and
   a detector to detect an intensity of the light from the measurement object, the light having passed through the filter, the detector to further measure the intensity of the light multiple times sequentially while the driver means slides the filter, thereby obtaining multiple pieces of measured data, and calculate spectral information by Hadamard transform on the basis of the multiple pieces of the measured data,
   wherein the filter has at any position, within a measurement target wavelength region of the detector, two or more discrete wavelength ranges with an 80-percent or more transmittance and three or more discrete wavelength ranges with a 20-percent or less transmittance at any position, the two or more discrete wavelength ranges with an 80-percent or more transmittance being the multiple wavelength ranges that are transmitted by the filter.

2. The spectral device as recited in claim 1, wherein the detector is a two-dimensional sensor, the spectral device further comprising:
   an objective optical system to form a first image of a measurement target surface on the filter; and
   a relay optical system to form a second image on the two-dimensional sensor with the light having passed through the filter.

3. The spectral device as recited in claim 1, wherein the filter includes a multilayer dielectric filter layer with a thickness that increases non-linearly in a direction that the filter slides.

4. The spectral device as recited in claim 1, wherein the driver means moves the filter by a predetermined amount each time the detector measures the intensity of the light so that a pseudo wavelength changes at a constant pitch, the pseudo wavelength being a logarithmically transformed wavelength.

5. A spectral measurement data obtaining method comprising the steps of:
   sliding a filter that changes a spectral transmittance depending on a position, the filter transmitting light of multiple wavelength ranges from a measurement object at any position to make the spectral transmittance allow Hadamard transform spectrometry,
   measuring, by a detector, an intensity of light from a measurement object multiple times sequentially while the filter is slid, the light having passed through the filter, whereby the detector obtains multiple pieces of measured data, and
   calculating spectral information by Hadamard transform on the basis of the multiple pieces of the measured data,
   wherein the filter has at any position, within a measurement target wavelength region of the detector, two or more discrete wavelength ranges with an 80-percent or more transmittance and three or more discrete wavelength ranges with a 20-percent or less transmittance at any position, the two or more discrete wavelength ranges with an 80-percent or more transmittance being the multiple wavelength ranges that are transmitted by the filter.

6. The spectral measurement data obtaining method as recited in claim 5,
wherein the detector is a two-dimensional sensor,
wherein an objective optical system forms a first image of a measurement target surface on the filter; and
wherein a relay optical system forms a second image on the two-dimensional sensor with the light having passed through the filter.

7. The spectral measurement data obtaining method as recited in claim 5, wherein the filter includes a multilayer dielectric filter layer with a thickness that increases non-linearly in a direction that the filter slides.

8. The spectral measurement data obtaining method as recited in claim 5, wherein the filter is slid by a predetermined amount each time the detector measures the intensity of the light so that a pseudo wavelength changes at a constant pitch, the pseudo wavelength being a logarithmically transformed wavelength.

* * * * *